(12) United States Patent
Kim

(10) Patent No.: US 7,090,232 B2
(45) Date of Patent: Aug. 15, 2006

(54) STEERING KNUCKLE ASSEMBLY FOR VEHICLES

(75) Inventor: Geun-Bae Kim, Kyunggi-do (KR)

(73) Assignee: Hyundai Mobis Co., Ltd., Yongin-shi (KR)

(*) Notice: Subject to any disclaimer, the term of this patent is extended or adjusted under 35 U.S.C. 154(b) by 352 days.

(21) Appl. No.: 10/720,339

(22) Filed: Nov. 25, 2003

(65) Prior Publication Data

US 2005/0051985 A1    Mar. 10, 2005

(30) Foreign Application Priority Data

Sep. 6, 2003    (KR) .................... 10-2003-0062336

(51) Int. Cl.
*B62D 7/16*    (2006.01)
(52) U.S. Cl. .................. 280/93.512; 280/93.51
(58) Field of Classification Search .......... 280/93.512, 280/93.502, 93.507, 93.51, 93.511; 403/169, 403/170, 178
See application file for complete search history.

(56) References Cited

U.S. PATENT DOCUMENTS

| | | | |
|---|---|---|---|
| 5,120,150 A | 6/1992 | Kozyra et al. | |
| 5,503,418 A * | 4/1996 | Schmidt et al. | 280/93.511 |
| 6,616,156 B1 * | 9/2003 | Dudding et al. | 280/93.512 |
| 2002/0135149 A1 * | 9/2002 | McHale | 280/93.512 |
| 2003/0107201 A1 * | 6/2003 | Chun | 280/124.135 |

FOREIGN PATENT DOCUMENTS

| | | |
|---|---|---|
| JP | 05-193513 | 8/1993 |
| JP | 06-201305 | 7/1994 |

OTHER PUBLICATIONS

English Language Abstract No. H05-193513.
English Language Abstract No. H06-201305.

* cited by examiner

*Primary Examiner*—David R. Dunn
(74) *Attorney, Agent, or Firm*—Greenblum & Bernstein, P.L.C.

(57) ABSTRACT

A steering knuckle assembly for vehicles includes a connector for connecting a tie rod to a knuckle body via a ball joint is freely attached to and detached from the knuckle body. In the case of changing a ball joint point at a terminal end of the tie rod, only the connector is separately developed and then mounted on the knuckle instead of developing a new knuckle structure, thereby reducing fabrication cost as well as improving workability.

15 Claims, 2 Drawing Sheets

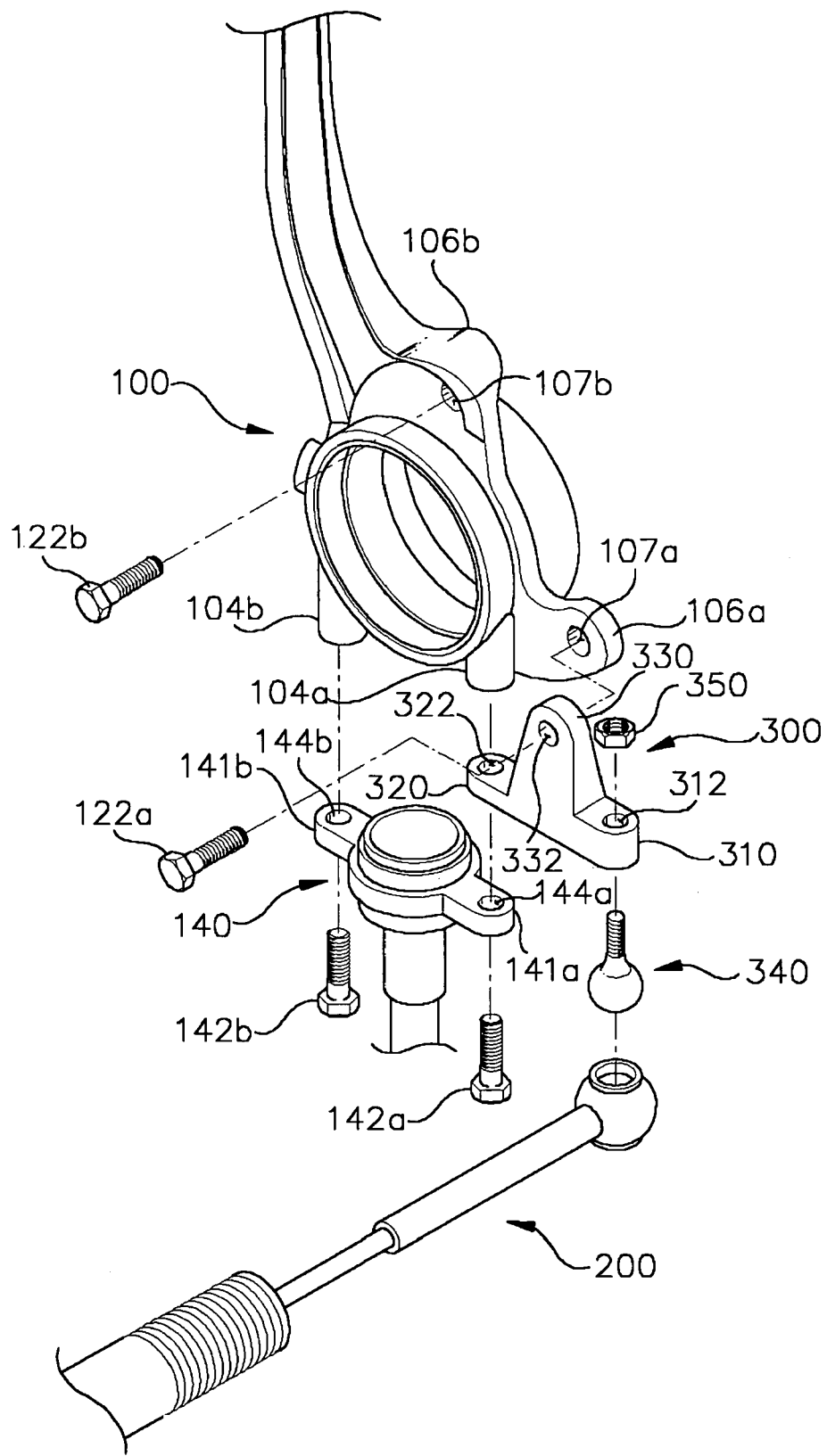
[FIG. 1]

[FIG. 2]
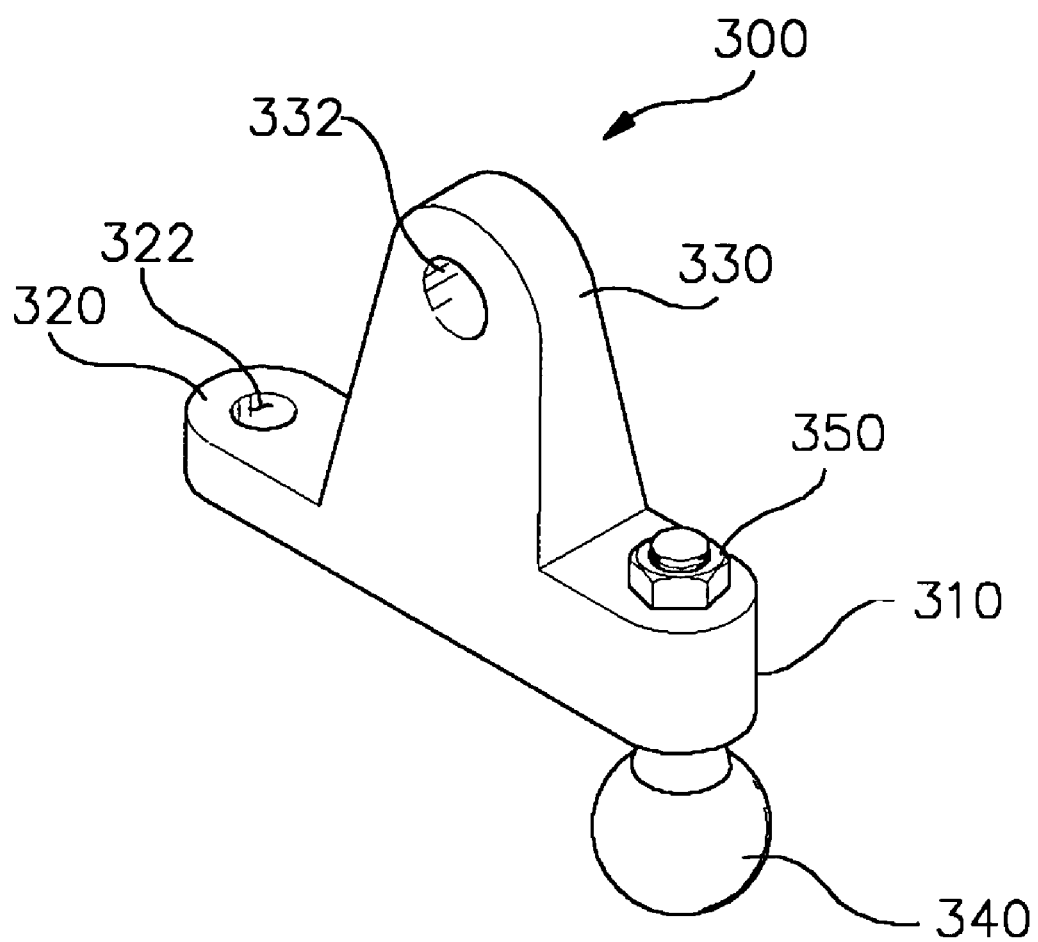

STEERING KNUCKLE ASSEMBLY FOR VEHICLES

The present disclosure relates to subject matter contained in priority Korean Application No. 10-2003-0062336, filed on Sep. 6, 2003, which is herein expressly incorporated by reference in its entirety.

BACKGROUND OF THE INVENTION

1. Field of the Invention

The present invention relates to a steering knuckle assembly for vehicles, which can be readily changed in the case of changing a tie rod end point having a decisive influence on the toe change of a vehicle so as to have appropriate toe characteristics without developing a new knuckle structure unlike in the prior art.

2. Background of the Related Art

In general, a steering system is used by a driver to change the traveling direction of a vehicle, and comprises an operation unit, a gear unit and a link unit.

The operation unit includes a steering wheel, a steering shaft and a column, and the driver directly operates the steering wheel to control both the gear unit and the link unit.

The gear unit functions to transfer the movement of the operation unit by changing the direction thereof. In a typical small vehicle, the gear unit utilizes a rack and a pinion so that rotation of the pinion imparts lateral movement to the rack meshed with the pinion.

The link unit functions to transfer the operation of the gear unit to front wheels while properly supporting the relational position of right and left wheels. The link unit comprises a tie rod connected to both ends of the rack and a steering knuckle which is connected to the tie rod via a ball joint.

In these circumstances, as the driver operates the steering wheel, the pinion cooperates with the rack so that the tie rod connected to the rack moves laterally so as to steer the wheels.

Some of conventional technologies related to the steering knuckle assembly are disclosed in detail in U.S. Pat. No. 5,120,150, Japanese Patent laid-open Publication No. Hei 5-193513, Japanese Patent laid-open Publication No. Hei 6-201305 and so on. According to these documents, an axle is inserted into a central portion of a knuckle via a ball bearing, in which a hub is inserted into the central portion of the knuckle, and a brake disk is attached to the hub.

Further, a ball joint bracket is mounted on a lower portion of the knuckle so that a ball joint which is arranged in a terminal end of a lower arm of a suspension can be coupled with the knuckle, and a terminal end of a tie rod is connected to the lower portion of the knuckle via the ball joint. On an upper portion of the knuckle, there is mounted a caliper for pressing against a rotating brake disk to create braking force.

According to the afore-described conventional knuckle assembly, however, in the case of changing a tie rod end point (i.e., a central point of the ball joint between the knuckle and the tie rod) which has a decisive influence on the toe change of a vehicle, the entire knuckle assembly is developed into a knew structure thereby raising fabricating cost as well as lowering workability.

SUMMARY OF THE INVENTION

The present invention has been made to solve the foregoing problems and it is therefore an object of the present invention to provide a steering knuckle assembly for vehicles which comprises a separate connector for connecting a tie rod with a knuckle body via a ball joint, wherein the connector is detachably fixed to the knuckle body so as to readily change a ball joint point of a tie rod terminal end.

To achieve the above object, according to the present invention, there is provided a steering knuckle assembly for vehicles comprising: a body; and a connector mounted to the body and connected to a terminal end of a tie rod via a ball joint, wherein the connector is detachably fixed to the body via a bolt.

According to the structure of the invention, in the case of changing the ball joint point between the knuckle body and the tie rod), only the connector is separately developed and then mounted on the knuckle instead of developing a new knuckle as in the prior art, thereby reducing fabrication cost as well as improving workability.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a perspective view illustrating a steering knuckle assembly for vehicles according to the invention; and FIG. 2 is an enlarged perspective view of a connector shown in FIG. 1.

DETAILED DESCRIPTION. OF THE PREFERRED EMBODIMENT

The following detailed description will present a preferred embodiment of the invention in reference to the accompanying drawings.

FIG. 1 is a perspective view illustrating a steering knuckle assembly for vehicles according to the invention, and FIG. 2 is an enlarged perspective view of a connector shown in FIG. 1.

Referring to FIGS. 1 and 2, the steering knuckle assembly of the invention comprises a knuckle body 100 and a connector 300 which is detachably assembled to the body 100 as well as connected to the tie rod 200 via a ball joint.

In lower portions of the knuckle body 100, there are provided a pair of ball joint-mounting sections 104a and 104b which are projected downward to mount a ball joint 140 connected to a lower arm of a suspension (not shown).

Screw holes (not shown) are formed inside the ball joint-mounting sections 140a and 104b to engage with bolts 142a and 142b. For the purpose of allowing passage of the bolts 142a and 142b, through holes 144a and 144b are formed in securing sections 141a and 141b which are placed in lateral portions of the ball joint 140.

In upper portions of the knuckle body 100, there are provided a pair of caliper-mounting sections 106a and 106b for mounting a caliper (not shown). The caliper-mounting sections 106a and 106b have through holes 107a and 107b formed inside thereof to allow passage of bolts 122a and 122b through the same.

The caliper is also provided with through holes (not shown) corresponding with the through holes 107a and 107b in the knuckle body 100 to enable engagement of the bolts 122a and 122b.

Accordingly, the bolts 122a and 122b are inserted into the through holes of the caliper (not shown) and the through holes 107a and 107b of the knuckle body 1000 and then nuts (not shown) are fixedly engaged with the bolts 122a and 122b at positions opposed to the caliper in order to assemble the caliper to the knuckle body 100.

The connector 300 is mounted in a lower portion of the knuckle body 100 to connect the knuckle body 100 with the tie rod 200.

The connector 300 is projected to a predetermined direction to form a connecting end 310 which is directly connected to the tie rod 200. The connecting end 310 has an insertion hole 312 formed inside thereof so as to receive a ball stud 340 which is coupled with a terminal end of the tie rod 200.

In these circumstances, the ball stud 340 inserted into the terminal end of the tie rod 200 is inserted into the through hole 312 and tightened with a nut 350 to pivotably assemble the tie rod 200 with the connector 300 via the ball joint 140.

The connector 300 also has a first fixing end 320 and a second fixing end 330 which allow the connector 300 to be fixedly fastened to the knuckle body 100.

The first fixing end 320 is placed between the securing section 1411a of the ball joint 140 and the ball joint-mounting section 104a of the knuckle body 100, and then fixedly assembled thereto via the bolt 142a.

The ball joint-mounting sections 104a and 104b preferably have a length difference corresponding to the thickness of the first fixing end 320 so that the ball joint 140 can be maintained horizontally in a lower end of the body 100 after the first fixing end 320 is assembled.

The length difference of the ball joint-mounting sections 104a and 104b can be minimized by reducing the thickness of the first fixing end 320 to a predetermined value.

Further, the second fixing end 330 is extended vertical with respect to the first fixing end 320, and provided with a through hole 332 inside thereof to allow passage of the bolt 122a through the same.

The second fixing end 330 is attached to the caliper-mounting section 106a of the knuckle body 100 and fixedly assembled with the caliper (not shown) via the bolt 122a.

As can be understood from the above assembling structure, the connector 30 is in the form of a separate structure to be freely attached to and detached from the knuckle body 100 so that the connector 300 can be substituted freely if necessary.

Further, in the case that the connector 300 is fixed to the knuckle body 100, the first fixing end 320 and the second fixing end 330 can be fixed together during mounting of the ball joint 140 and the caliper so as to minimize the number of components necessary for assembly of the connector 300 as well as maximize the spatial efficiency within the knuckle body 100.

The second fixing end 320 and the third fixing end 330 are fixed to the knuckle body 100 in a mutually perpendicular arrangement to enhance the structural fixing strength of the connector 300.

According to the invention of the above structure, the connector 300 for connecting the tie rod 200 to the knuckle body 100 is freely attached to and detached from the knuckle body 100 via the bolts 122a and 142a. As a result, in the case of changing a ball joint point between the knuckle body 100 and the tie rod 200, only the connector is separately developed and then mounted on the knuckle instead of developing a new knuckle as in the prior art.

According to the present invention as set forth above, in the case of changing a tie rod end point (i.e., a central point of the ball joint between the knuckle and the tie rod) which has a decisive influence on the toe change of a vehicle, only the connector is separately developed and then mounted on the knuckle instead of developing a new knuckle as in the prior art, thereby reducing fabrication cost as well as improving workability.

Furthermore, the first fixing end of the connector is placed between the ball joint-mounting sections of the knuckle body and the ball joint to be fixedly assembled along with the ball joint, and at the same time, the second fixing end is fixedly assembled to the caliper-mounting sections together with the caliper so as to maximize the spatial efficiency of the knuckle body as well as reduce fabrication cost according to reduction in the number of components.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A steering knuckle assembly for vehicles comprising:
    a body; and
    a connector mounted to the body, connected to a terminal end of a tie rod via ball joint coupling, and detachably fixed to the body via a bolt,
    wherein the connector comprises a first end configured to connect to a terminal end of a tie rod via ball joint coupling, a second end configured to be detachably fixed between the body and a ball joint connected to a lower arm of a suspension, and a third end configured to be detachably fixed between the body and a caliper.

2. The steering knuckle assembly as set forth in claim 1, wherein the body has a ball joint-mounting section that mounts the ball joint and a caliper-mounting section that mounts the caliper.

3. The steering knuckle assembly as set forth in claim 2, wherein the second end is configured to be placed between the ball joint-mounting section and the ball joint.

4. The steering knuckle assembly as set forth in claim 2, wherein the third end is configured to be fixed to the caliper mounting section together with the caliper.

5. The steering knuckle assembly as set forth in claim 3, wherein the third end is configured to be fixed to the caliper mounting section together with the caliper.

6. The steering knuckle assembly as set forth in claim 1, wherein the second end and the third end are mutually perpendicular, so as to be detachably fixed to the body in perpendicular directions.

7. The steering knuckle assembly as set forth in claim 2, wherein the second end and the third end are mutually perpendicular, so as to be respectively fixed to the ball joint-mounting section and the caliper-mounting section in perpendicular directions.

8. The steering knuckle assembly as set forth in claim 1, wherein the first end includes a through hole configured to receive a ball stud.

9. The steering knuckle assembly as set forth in claim 1, wherein the second end includes a through hole configured to receive a bolt.

10. The steering knuckle assembly as set forth in claim 1, wherein the third end includes a through hole configured to receive a bolt.

11. The steering knuckle assembly as set forth in claim 1, wherein the second end includes a through hole configured to receive a bolt, the third end includes a through hole configured to receive a bolt, the through hole of the second end and the through hole of the third end being mutually perpendicular, so as to be detachably fixed to the body in perpendicular directions.

12. The steering knuckle assembly as set forth in claim 2, wherein the first end includes a through hole configured to receive a ball stud.

13. The steering knuckle assembly as set forth in claim 2, wherein the second end includes a through hole configured to receive a bolt.

14. The steering knuckle assembly as set forth in claim 2, wherein the third end includes a through hole configured to receive a bolt.

15. The steering knuckle assembly as set forth in claim 2, wherein the second end includes a through hole configured to receive a bolt, the third end includes a through hole configured to receive a bolt, the through hole of the second end and the through hole of the third end being mutually perpendicular, so as to be respectively fixed to the ball joint-mounting section and the caliper-mounting section in perpendicular directions.

* * * * *